United States Patent
Weger et al.

(10) Patent No.: US 9,313,837 B2
(45) Date of Patent: Apr. 12, 2016

(54) CONTROL CIRCUIT FOR LED BACKLIGHTING

(71) Applicant: Minebea Co., Ltd., Nagano (JP)

(72) Inventors: Robert Weger, Wels (AT); Mykhaylo Raykhman, Munich (DE)

(73) Assignee: MINEBEA CO., LTD., Nagano (JP)

( * ) Notice: Subject to any disclaimer, the term of this patent is extended or adjusted under 35 U.S.C. 154(b) by 265 days.

(21) Appl. No.: 13/858,512

(22) Filed: Apr. 8, 2013

(65) Prior Publication Data
US 2013/0293125 A1    Nov. 7, 2013

(30) Foreign Application Priority Data
Apr. 18, 2012    (DE) .......................... 10 2012 007 746

(51) Int. Cl.
| H05B 37/00 | (2006.01) |
| H05B 39/00 | (2006.01) |
| H05B 41/00 | (2006.01) |
| H05B 33/08 | (2006.01) |

(52) U.S. Cl.
CPC ........ *H05B 33/0806* (2013.01); *H05B 33/0815* (2013.01); *H05B 33/0827* (2013.01); *Y02B 20/348* (2013.01)

(58) Field of Classification Search
CPC ........... H05B 33/0806; H05B 33/0827; H05B 33/0815; Y02B 20/348
USPC .............. 315/186, 219, 291; 345/82, 84, 102, 345/204, 207, 690
See application file for complete search history.

(56) References Cited

U.S. PATENT DOCUMENTS

| 8,228,001 B2 * | 7/2012 | Fan ..................... H05B 33/0815 |
| | | 315/169.1 |
| 2007/0080911 A1 | 4/2007 | Liu et al. |
| 2011/0012936 A1 | 1/2011 | Kim |
| 2011/0057960 A1 * | 3/2011 | Kim et al. ..................... 345/690 |
| 2011/0266964 A1 | 11/2011 | Schlenk et al. |
| 2012/0062147 A1 | 3/2012 | Fan |

FOREIGN PATENT DOCUMENTS

| DE | 10 2008 064 399 A1 | 6/2010 |
| DE | 10 2009 040 284 A1 | 3/2011 |
| DE | 10 2010 031 247 A1 | 9/2011 |
| DE | 10 2010 020 483 A1 | 11/2011 |

* cited by examiner

*Primary Examiner* — Diana J Cheng
(74) *Attorney, Agent, or Firm* — Grossman, Tucker, Perreault & Pfleger, PLLC

(57) ABSTRACT

The invention describes a control circuit for backlighting having a plurality of control channels in each of which a light emitting diode string is controlled. The control circuit has a balancing device for balancing the currents in the individual control channels, and a control unit that is connected to a power factor correction circuit (PFC), to a bridge circuit and to a primary-side current measuring device. Each control channel has a switch for switching the light emitting diode string that is connected to a separate dimming signal. The control circuit furthermore has at least one smoothing capacitor and one current limiter that limits the charging current for the smoothing capacitor. The control unit is additionally designed such that if all the dimming signals are logical ON, the output voltage of the PFC is regulated with the aid of the current measuring device such that the current on the primary side corresponds to a pre-determined setpoint value and that as soon as at least one dimming signal is logical OFF, the output voltage of the PFC is kept constant at its last value (FIG. 4).

9 Claims, 3 Drawing Sheets

Fig. 1 (State of the art)
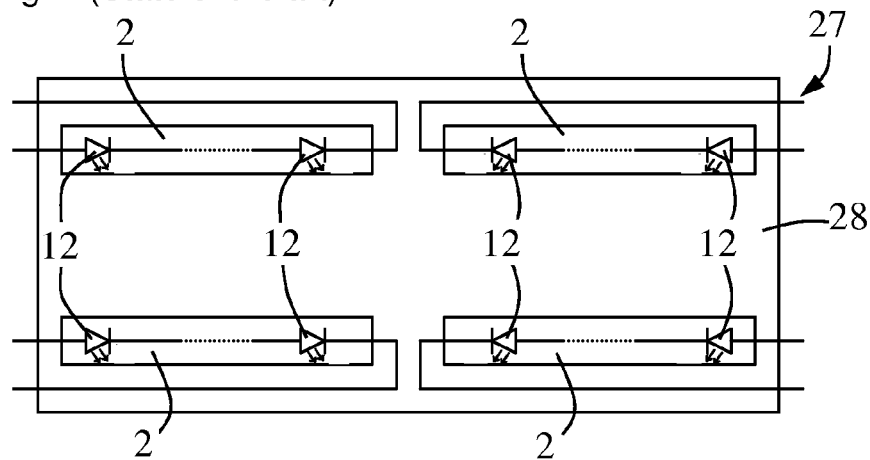
Fig. 2 (State of the art)
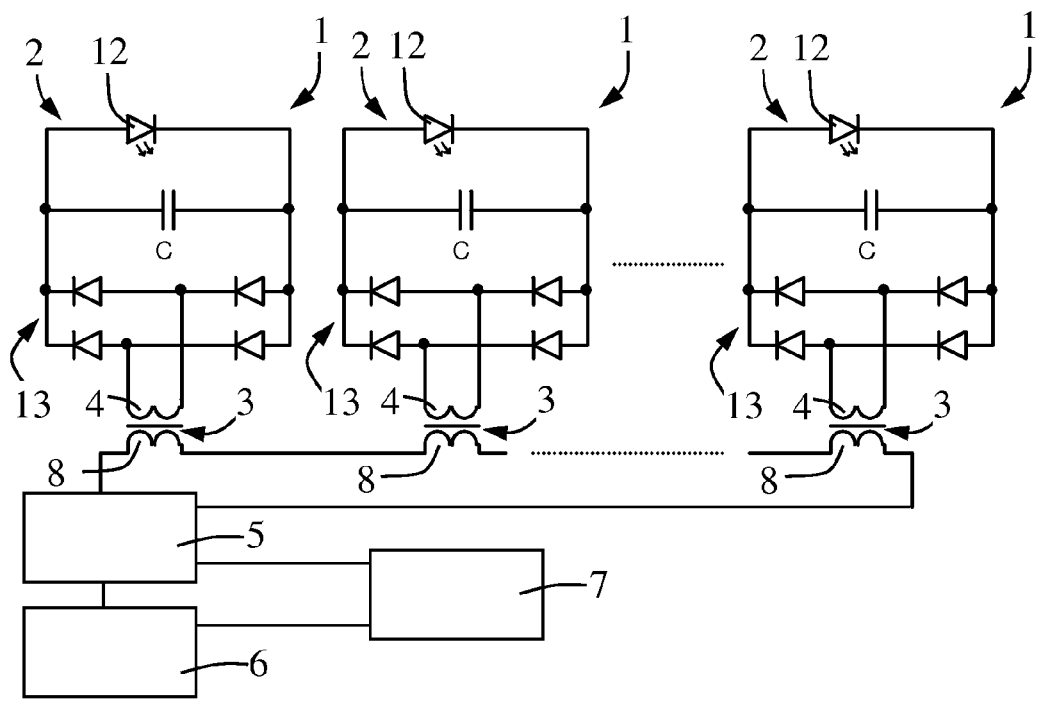
Fig. 3 (State of the art)
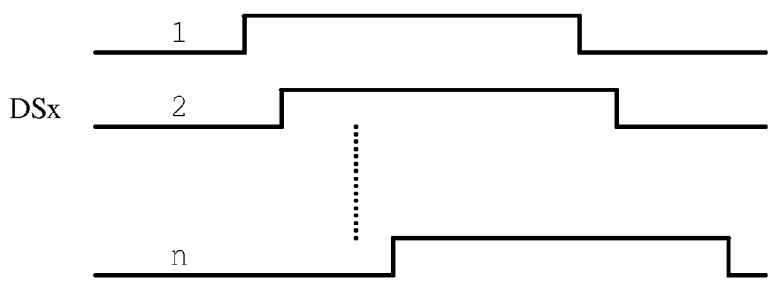

CONTROL CIRCUIT FOR LED BACKLIGHTING

FIELD OF THE INVENTION

The invention describes a control circuit for light emitting diodes having a plurality of control channels and a balancing device for balancing the currents in the individual control channels, having a control unit that is connected to a power factor correction circuit or respectively a power factor correction controller (PFC), to a bridge circuit and to a current measuring device on the primary side.

BACKGROUND OF THE INVENTION

Flat-screen televisions and monitors having liquid crystal displays require backlighting. This backlighting is being increasingly realized using light emitting diodes (LED) rather than cold cathode tubes since LEDs need less energy and have a longer useful life. In FIG. 1, a television 27 having this kind of backlighting is outlined. The light emitting diodes 12 are disposed here in a plurality of light emitting diode strings 2 (LED string) at the upper and lower edges of the television screen 27. In the example, two light emitting diode strings 2 are disposed at the top and at the bottom of a screen 28. The light of the light emitting diodes 12 is distributed uniformly over the entire screen surface by a diffusion disk.

A LED string 2 may consist of a plurality of light emitting diodes 12 that are connected in series and/or in parallel.

In order to obtain uniform illumination over the surface of the screen in this kind of construction, it is absolutely essential for all the light emitting diode strings to have the same brightness. This is achieved in that, with the aid of a balancing circuit, the currents in the individual light emitting diode strings are balanced.

A control circuit having this kind of balancing circuit is shown by way of example in FIG. 2. The control circuit has a plurality of control channels 1 in each of which an LED string 2 is controlled. A balancing transformer 3 acting as a balancing device is disposed in each control channel 1. The primary windings 4 of all the transformers 3 are connected in series and connected to a bridge circuit 5 acting as an AC voltage source. The bridge circuit 5 is supplied via a power factor correction controller 6 (PFC) with a DC voltage. The PFC 6 and bridge circuit 5 are connected to a control unit 7 that regulates, for example, the output voltage of the PFC 6. The LED strings 2 are each connected via a bridge rectifier 13 to the secondary windings 8 of the balancing transformers 3. The lamp current in all control channels 1 is identical and corresponds to the active current in the primary windings 4.

Dimming the light emitting diode strings is made possible in this circuit by varying, for example, the primary-side current, for instance, through modulation of the primary voltage or current source (burst mode dimming) However, since all the control channels are balanced, they will be dimmed identically.

In some applications, however, it is necessary for the control channels in burst mode dimming to be switched on and then off again with a slight time delay, as is shown in the time diagram in FIG. 3. Dimming the lamps while maintaining current balancing is then only possible, for example, if each control channel has its own regulated power supply. A control circuit of this kind, however, is complex and expensive.

It is thus an object of the invention to create a simple control circuit that allows the control channels to be switched with a time delay while at the same time maintaining balancing of the lamp currents in the individual lamp channels.

SUMMARY

Each control channel has a switch for switching the light emitting diode string. Hence, each light emitting diode string can be independently switched on and off. The switches are each connected to a separate dimming signal. To generate the dimming signals, the control circuit preferably has a dimming signal generator.

Moreover, the control circuit has at least one smoothing capacitor and one current limiter that limits the charging current for the smoothing capacitor. Current limitation is very important in this circuit arrangement since on switching the light emitting diode strings, and particularly during the initial switching on of the power supply, very high charging currents occur.

According to the invention, the control unit is designed such that if all the dimming signals are logical ON, the output voltage of the PFC is regulated with the aid of the current measuring device such that the current on the primary side corresponds to a pre-determined setpoint value and that as soon as at least one dimming signal is logical OFF, the output voltage of the PFC is set to a pre-determined constant value. This makes it possible to achieve adequate current balancing in the individual control channels with little extra effort and expense in terms of circuitry. The circuit according to the invention can thus be simply constructed at low cost.

In an embodiment of the invention, all the dimming signals are linked in a logical unit using a logical AND operation to an aggregate dimming signal, and the aggregate dimming signal is connected as a switching signal to a switch-over device that switches over the PFC control signal between the current measuring signal and a fixed reference value. Here, the AND logical unit may be a separate component or integrated, for example, in the control unit.

An embodiment of the invention is characterized in that in each control channel a balancing transformer and a bridge rectifier is disposed, that the primary windings of all the balancing transformers are connected in series and connected to a voltage supply, that the secondary windings of the balancing transformers are each connected to the bridge rectifier, that the positive outputs of all the bridge rectifiers are connected to one another and the negative terminals each form individual channel grounds that are connected to one another via pairs of diodes inversely connected in parallel.

In an alternative embodiment of the invention, a balancing transformer is disposed in each control channel. The primary windings of all the balancing transformers are connected in series and connected to a voltage supply. The secondary windings of the balancing transformers each have a center tap that forms a channel ground and the two positive outputs have a rectifier diode each.

The channel grounds of the control channels are each connected to ground via at least one pair of diodes inversely connected in parallel. The potential of the channel grounds is thereby decoupled from ground for small voltage differences up to the forward voltage of the diodes. This produces a return current flow path for the gate signals and at the same time it is possible for the voltages of the light emitting diode strings to vary slightly.

Alongside the above embodiment of the control circuit, a method for operating a control circuit having a plurality of control channels for light emitting diode strings that can be separately dimmed using separate dimming signals also forms part of the invention, wherein the control circuit has a power factor correction circuit and a current measuring device. In a method according to the invention, when all the dimming signals are logical ON, the output voltage of the PFC is regulated with the aid of the current measuring device such that the current on the primary side corresponds to a pre-determined setpoint value. As soon as at least one dimming signal is logical OFF, the output voltage of the PFC is kept constant at its last value through regulation. As long as all the dimming signals are logical ON, the regulation loop operates on a current-controlled basis and when at least one dimming signal is logical OFF, the regulator changes over to a voltage-controlled operating mode.

DESCRIPTION OF DRAWINGS

Examples of the invention are described in more detail below with reference to the enclosed drawings.

The figures show:

FIG. 1: a schematic view of a backlight according to the prior art for a screen (e.g. a flat-screen television) having light emitting diode strings that are disposed at the upper and lower edges of the screen, FIG. 2: a detail of a control circuit according to the prior art having balancing transformers that are connected in series on the primary side, FIG. 3: a time diagram with slightly time-delayed dimming signals for each control channel of a control circuit.

DESCRIPTION OF EXAMPLES

Figure 4:
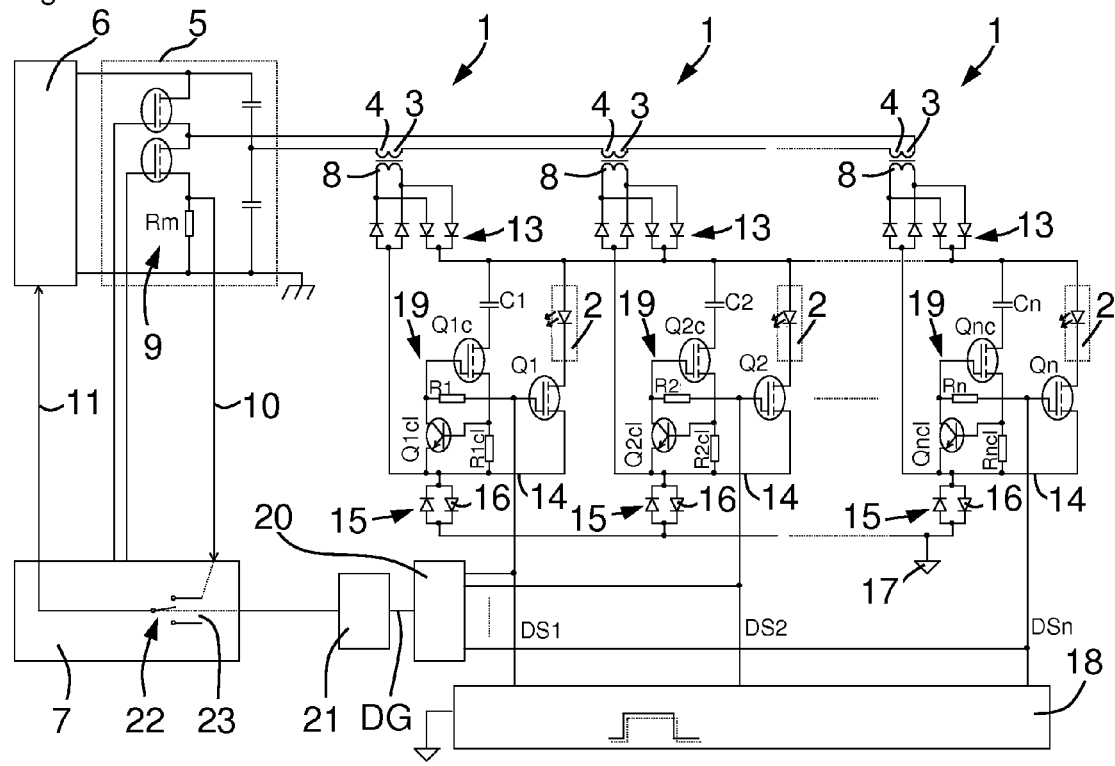
FIG. 4: a control circuit according to an example having a bridge rectifier and a current limiter in each control channel.

FIG. 4 shows a first embodiment of a control circuit. The control circuit has a power factor correction circuit (PFC) 6 as its DC voltage source. The regulated DC voltage of the PFC 6 is converted in a downstream bridge circuit 5 to a high-frequency AC voltage. In the example, a half bridge is illustrated. The circuit may, however, also have a full bridge or some other inverter.

The clock frequency of the AC voltage is usually about 100 kHz. However, the frequency may be nearly arbitrarily varied according to the requirements of the application.

The bridge circuit has two switches that are controlled by a control unit 7.

The control circuit has furthermore a current measuring device 9 that monitors the overall current on the primary side. For this purpose, a measuring resistor Rm is disposed in the bridge circuit 5 in this example. The voltage drop at the measuring resistor Rm is a measurement for the current that flows through the half bridge 5.

The current measuring signal 10 is connected to the control unit 7 which compares the measured value with a fixed setpoint value and accordingly relays a PFC control signal 11 to the PFC 6 that thereupon regulates its output voltage such that the primary current corresponds as closely as possible to the setpoint value.

The control circuit has a plurality of control channels 1 in each of which a light emitting diode string 2 is disposed. Each light emitting diode string 2 consists of at least one light emitting diode 12, where a plurality of light emitting diodes may be connected in parallel and/or in series.

The control channels 1 are supplied through the bridge circuit 5 with an AC voltage. For balancing the current in all the control channels 1, each control channel 1 has a balancing transformer 3. The primary windings 4 of all the balancing transformers 3 are connected in series and connected to the bridge circuit 5. The secondary winding of the balancing transformer 3 is each connected to a bridge rectifier 13.

The positive outputs of all the bridge rectifiers 13 are connected to one another. They thereby form a common anode for the light emitting diode strings 2. The negative terminals each form a channel ground 14.

These channel grounds 14 are connected to ground 17 through at least one pair 15 of diodes 16 connected antiparallel. This pair of diodes 15 decouples the potential of the channel grounds 14 for small variations in voltage in the region of the forward voltage of the diodes 16 from the potential of ground 17. For one thing, the pair of diodes allows the voltages of the light emitting diode strings 2 to vary slightly and in addition provides a return current flow path for the gate signals (dimming signals).

For dimming using burst mode dimming, a switching element Qx (x=1 . . . n) is connected between the cathode terminal of the light emitting diode string 2 and the channel ground 14. In the example, the switching element Qx takes the form of a MOSFET. A dimming signal DSx (x=1 . . . n) acts as a switching signal, which is separately generated by a dimming signal generator 18 for each control channel 1.

Each control channel 1 additionally has a smoothing capacitor Cx (x=1 . . . n) and a current limiter 19 that limits the charging current of the smoothing capacitor Cx. Particularly when the voltage supply is first switched on, very high charging currents occur here, so that this current limiter is absolutely essential for the functioning of the circuit.

The current limiter 19 has a switch Qxc (x=1 . . . n) that takes the form of a MOSFET in the example. The source terminal of this switch Qxc is connected to the capacitor Cx, and the drain terminal is connected via a resistor Rxc1 (x=1 . . . n) to the channel ground 14. This resistor Rxc1 and a switch Qxc1 (x=1 . . . n) limit the current through the switch Qxc and thus prevent excessive charging currents at the smoothing capacitor Cx. The gate terminal is connected via a resistor Rx (x=1 . . . n) to the dimming signal DSx acting as a switching signal. The transistor Q1c thus switches the light emitting diode string 2 synchronous with the transistor Q1.

The drain terminal is furthermore directly connected to the base of the npn bipolar transistor Q1c1. The collector of this bipolar transistor is connected to the gate terminal of the switch Q1c and the emitter is connected to the channel ground 14.

This arrangement of the limiting circuits 19 in each control channel 1 ensures very good current balancing in the individual channels. This applies particularly when the control channels 1 are switched with a time delay, as shown in the time diagram of FIG. 3.

According to the example, all the dimming signals DSx are additionally connected to a logical unit 20 that links all the dimming signals DSx through a logical AND operation to an aggregate dimming signal DG. This aggregate dimming signal DG is then only logical ON when all the dimming signals DSx are logical ON, otherwise it is logical OFF. The aggregate dimming signal DG is connected via galvanic isolation, an optocoupler 21 in the example, to the control unit 7.

The control unit 7 has a changeover switch 22 for which the aggregate dimming signal DG acts as a switching signal. When the aggregate dimming signal DG is logical ON, this changeover switch 22 connects the current measuring signal 10 of the current measuring device 9 to the control unit 7. The control unit 7 generates the PFC control signal 11 from this, or relays it as such. This results in the primary current being regulated to a fixed setpoint value by means of a change in the PFC voltage.

If the aggregate dimming signal DG is logical OFF, the regulator then switches over to a voltage-controlled operating mode, where the value of the PFC voltage that was present at the time of the switchover is taken as the voltage setpoint. This means the PFC voltage is simply frozen as long as the DG is logical OFF. The PFC 6 then replaces current control by voltage control.

Current control of the PFC 6 is generally relatively sluggish. This is why the PFC 6 cannot follow the rapid load change that occurs through the time-delayed dimming of the control channels 1. Thus according to the invention, the current control is only activated via the changeover switch 22 and the aggregate dimming signal DG when all the control channels 1 are logical ON. Otherwise a constant voltage value is simply emitted. This is possible since the time in which the time-delayed switching of the individual dimming signals DSx takes place is short compared to the time in which all the dimming signals DSx are on. The consequent loss in quality is practically not discernible.

The control circuit can thus be constructed very simply and at low cost, and nevertheless achieve very high current balancing quality in the individual control channels. Particularly where there are varying and time-delayed dimming signals in the individual control channels.

Figure 5:
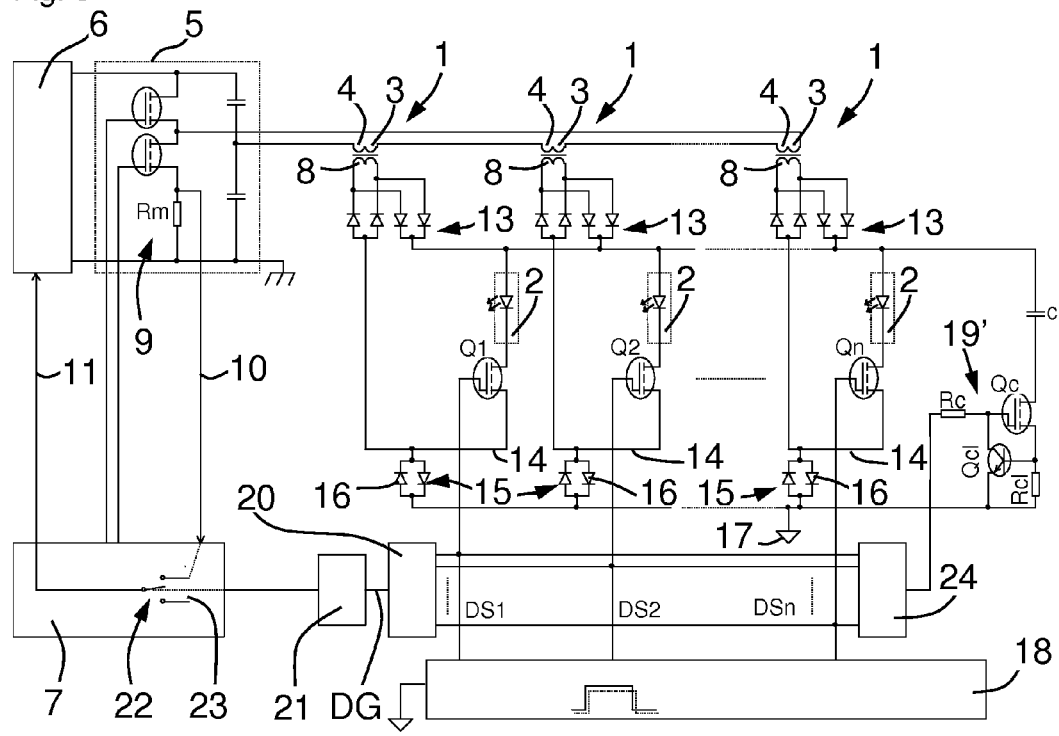
FIG. 5: a simplified embodiment of the control circuit according to an example according to FIG. 4, having a common current limiter for all the control channels.

If the requirements placed on current balancing in the control channels 1 are not quite as high, the circuit may be made even more simple in that only one central current limiter 19' is provided. A circuit of this kind is shown in FIG. 5. In this circuit, a smoothing capacitor C is connected to the common anode and connected via a limiting circuit 19' to ground 17. The limiting circuit 19' corresponds to the limiting circuits 19 of the preceding circuit design.

Acting here as the switching signal for the transistors Qc and Qc1 of the limiter 19', is a logical OR operation of the individual dimming signals DSx that takes place in an OR logical component 24. In principle, however, the function of the circuit remains the same.

Figure 6:
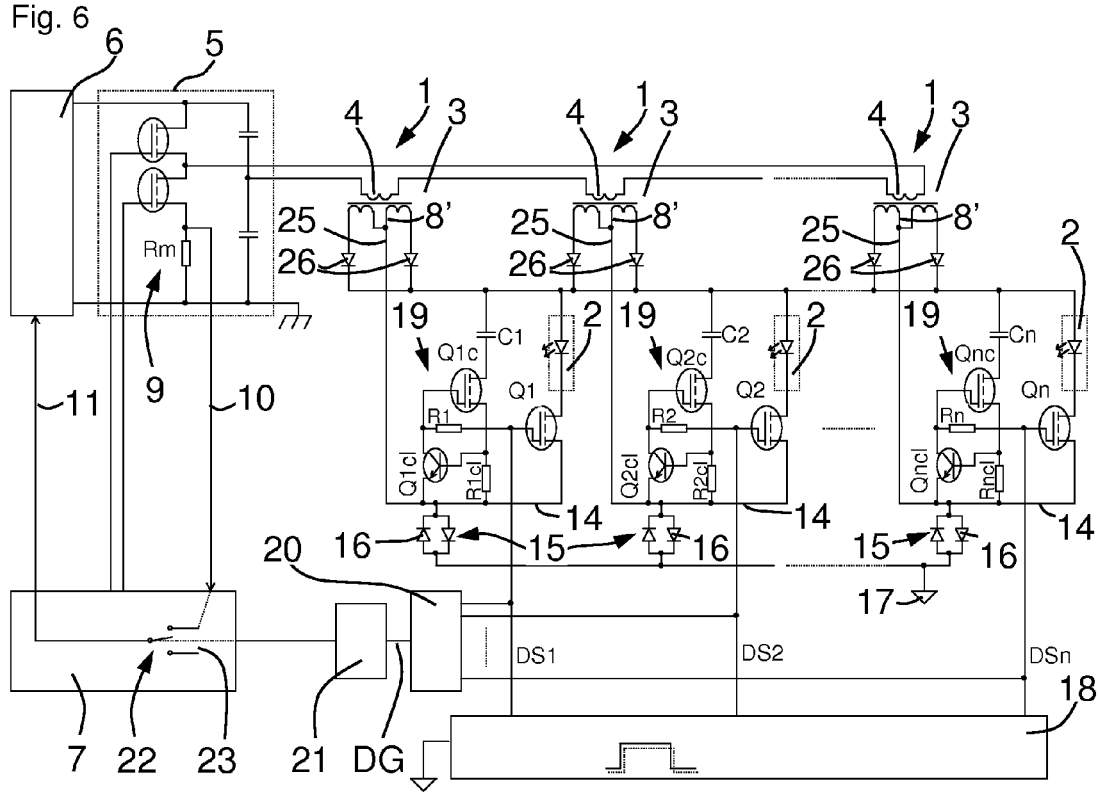
FIG. 6: a control circuit according to an example having balancing transformers having a center tap, simple rectifier diodes and a current limiter in each control channel

In FIG. 6, a further alternative example is shown that substantially corresponds to FIG. 4. It differs, however, in that here the secondary winding 8' has a center tap 25 that acts as a channel ground 14. At the two positive outputs of the secondary winding, only one simple diode 26 is disposed for rectification, so that the transformer as a whole is designed as a push-pull rectifier. Instead of a winding having a center tap, two separate windings may also be used that are connected in the center such that a center tap is produced.

The advantage in this variant of the circuit is that there is a lower voltage drop at the rectifier diode 26. This is particularly advantageous for short light emitting diode strings 2 in which the voltage drop at a bridge rectifier would otherwise be large compared to the operating voltage of the LED string 2.

Figure 7:
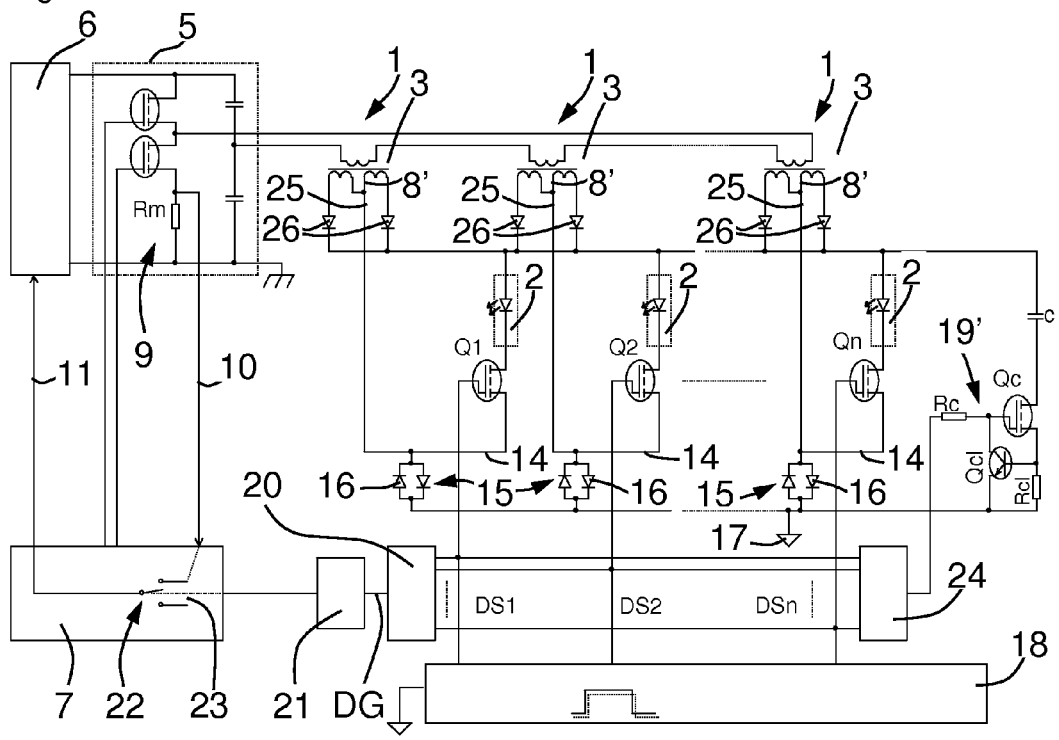
FIG. 7: a control circuit according to FIG. 6 having a common current limiter for all the control channels.

The circuit variant having a center tap can also be realized in the simplified embodiment having only one limiting circuit, as shown in FIG. 7.

IDENTIFICATION REFERENCE LIST

1 Control channel
2 Light emitting diode string
3 Balancing transformer
4 Primary winding
5 Bridge circuit
6 Power factor correction circuit (PFC)
7 Control unit
8,8' Secondary winding
9 Current measuring device
10 Current measuring signal
11 PFC control signal
12 Light emitting diode
13 Bridge rectifier
14 Channel ground
15 Pair of diodes
16 Diode
17 Ground
18 Dimming signal generator
19, 19' Current limiter
20 AND logical unit
21 Optocoupler
22 Switch-over device
23 Fixed voltage value
24 OR logical component
25 Center tap
26 Rectifier diode
27 Television
28 Screen
DSx Dimming signals (x=1 ... n)
DG Aggregate dimming signal
Rm Measuring resistor
Qx MOSFET switch (x=1 ... n)
Qc,Qxc MOSFET switch (x=1 ... n)
Qc1,Qxc1 Bipolar transistor (x=1 ... n)
Rc1,Rxc1 Resistor (x=1 ... n)
C, Cx Capacitor (x=1 ... n)
Rc,Rx Resistor (x=1 ... n)

What is claimed is:

1. A control circuit for light emitting diodes, comprising:
   a plurality of control channels;
      wherein each control channel has a switch for switching a light emitting diode string that is connected to a separate dimming signal;
   a logical AND unit; and
   a balancing device for balancing the currents in the individual control channels, the balancing device including a control unit that is connected to a power factor correction circuit (PFC), to a bridge circuit and to a primary-side current measuring device,
   such that:
      if all the dimming signals to the logical AND unit are logical ON, the output voltage of the PFC is regulated by the primary-side current measuring device such that the primary-side current corresponds to a predetermined setpoint value; and
      as soon as at least one dimming signal to the logical AND unit is logical OFF, the output voltage of the PFC is kept constant at its last value.

2. A control circuit according to claim 1, wherein all the dimming signals are linked through the logical AND unit to an aggregate dimming signal and the aggregate dimming signal acting as a switching signal is connected to a switchover device that switches over the PFC regulation mode between current control and voltage control.

3. A control circuit according to claim 1, wherein a dimming signal generator is provided for generating the separate dimming signals.

4. A control circuit according to claim 1, wherein the control circuit has at least one smoothing capacitor and one current limiter that limits the charging current for the smoothing capacitor.

5. A control circuit according to claim 1, wherein in each control channel, a balancing transformer and a bridge rectifier are disposed, that the primary windings of all the balancing transformers are connected in series and connected to a voltage supply, and that the secondary windings of the balancing transformers are each connected to the bridge rectifier.

6. A control circuit according to claim 1, wherein the positive outputs of all the bridge rectifiers are connected to one another and the negative terminals each form a channel ground.

7. A control circuit according to claim 1, wherein in each control channel a balancing transformer is disposed, that the primary windings of all the balancing transformers are connected in series and connected to a voltage supply, that the secondary windings of the balancing transformers each have a center tap that forms a channel ground and that the two positive outputs each have a rectifier diode.

8. A control circuit according to claim 1, wherein the channel ground of the control channels is connected to ground via at least one pair of diodes inversely connected in parallel for decoupling the potential.

9. A method for operating a control circuit having a plurality of control channels for light emitting diode strings that can be separately dimmed using separate dimming signals, wherein the control circuit has a logical AND unit, a power factor correction circuit and a current measuring device, wherein when all the dimming signals to the logical AND unit are logical ON, the output voltage of the PFC is regulated with the aid of the current measuring device such that the current on the primary side corresponds to a pre-determined setpoint value and that as soon as at least one dimming signal to the logical AND unit is logical OFF, the output voltage of the PFC is kept at its last value.

* * * * *